United States Patent

[11] 3,617,416

| [72] | Inventor | Robert V. Kromrey<br>Placerville, Calif. |
|------|----------|------------------------------------------|
| [21] | Appl. No. | 648,447 |
| [22] | Filed | June 23, 1967 |
| [45] | Patented | Nov. 2, 1971 |
| [73] | Assignee | Aerojet-General Corporation<br>El Monte, Calif. |

[54] HONEYCOMB STRUCTURES
17 Claims, 13 Drawing Figs.

[52] U.S. Cl. ............................................. 156/173,
156/197, 156/297, 156/469, 161/68
[51] Int. Cl. ............................................. B31c 13/00
[50] Field of Search ........................................ 161/68, 69;
156/197, 173, 297, 205, 469; 264/136, 137

[56] References Cited
UNITED STATES PATENTS

| 2,477,852 | 8/1949 | Bacon | 156/292 X |
|-----------|--------|-------|-----------|
| 2,493,032 | 1/1950 | Rheinfrank, Jr. | 161/69 |
| 2,606,133 | 8/1952 | Hauens | 156/469 |
| 2,760,548 | 8/1956 | Dalo | 156/58 C X |
| 2,941,759 | 6/1960 | Rice et al. | 102/105 |
| 3,145,000 | 8/1964 | Mackie | 102/105 |
| 3,169,898 | 2/1965 | Kazimi | 156/197 X |
| 3,356,555 | 12/1967 | Jackson | 156/205 |

*Primary Examiner*—Samuel W. Engle
*Attorneys*—Edward O. Ansell and D. Gordon Angus ABSTRACT: A method and resultant structure consisting of fiber-reinforced honeycomb that is integrally molded to a substrate material wherein the honeycomb is formed of fibers wrapped about dies having the configuration of the desired cells. The fibers utilized may form the actual substrate for the honeycomb in one embodiment, while in another embodiment of the invention a separate substrate is bonded to macerated fibers comprising the cellular walls. The molds are left in the formed structure during the solidification thereof, and can be permanently left in the cells when so desired or removed after formation of the final integrated item.

INVENTOR.
ROBERT V. KROMREY
BY Edward O. Ansell
ATTORNEY

HONEYCOMB STRUCTURES

It has been found that a honeycomb structure secured to a given surface provides high structural reinforcement for that surface. Most such structures have found application in high-temperature embodiments where the honeycomb strengthens a heat protective substrate. One application for these structures is as a furnace liner where the substrate is of an ablative material backed by a honeycomb of fiber-reinforced resin. Some other types of honeycomb reinforced substrates would include coverings to protect underlying structure from exposure to the elements and from impact damage. Once again, in such utilization the substrate which would normally be exposed to the elements could be of a heat protective or even ablative material, while the honeycomb underneath the substrate layer adjacent the surface to be protected would be of a fiber-reinforced resin. There are of course many other known high temperature and ambient environment uses for the structural properties of honeycomb bodies, such as airplane fuselages and boat hulls.

Prior to the herein invention, the honeycomb structures were normally affixed to the substrate materials by adhesive bonding. The honeycomb core was prefabricated of fiber-reinforced resins. It was then secured by various resins to the substrate. The bond between the honeycomb and the substrate is temperature sensitive and was the primary source of failure of such structures when exposed to high temperatures for short durations or even lower temperatures over extended periods of time. An additional disadvantage of the prior art method related to forming the honeycomb structure over curved bodies, such as those quite often encountered in utilizing products of this nature. Normally, this was accomplished by taking a prefabricated honeycomb structure and bending it under temperature conditions to a previously curved substrate. In the prior art method and resulting structures, the cellular walls of the honeycomb structure were thus not perpendicular to the substrate surface but rather were stretched or deformed as much as possible to conform to the curved substrate. This decreases the structural reinforcing ability of the honeycomb. Further, utilizing prefabricated honeycomb structures there is little control over cell size, cell placement and different cell wall thicknesses to suit various design requirements in a given area of the resultant structure.

Often it is desirable to fill the formed honeycomb structure with an ablative material or other heat absorbent composition. This is particularly useful where the cellular structure is directly exposed to an outer environment and the cell walls thus act as a reinforcement for the ablative material. Prior to the herein invention the filling was accomplished after the honeycomb structure was affixed to the substrate. This provided for little ability to inspect the full cells as to their integrity. In some instances, there was a poor bond to the cell walls, with a possible result in loss of the material.

The herein invention overcomes the deficiency of the prior honeycomb structures and provides a unique method for forming improved items of this nature. This invention utilizes metallic or nonmetallic dies formed as continuous individual strips of cells having the desired end configuration. When the individual die strips are placed side by side and interfitted, they form a mold for a honeycomb structure. Fabric or individual fibers which are normally preimpregnated with, for example, a suitable curable resin are then wound between the dies to form the cellular walls of the honeycomb structure. The dies thus serve as the actual honeycomb cell at this point. In one embodiment wherein the cell walls have a curvature so as to prevent wrinkle of the wall fabric and improve the drape of the fabric, the material used to form the cell walls is additionally laid over the dies to form the substrate. The thickness of the substrate in this embodiment is determined by the number of cells that are covered by each layer of material. When more conventional honeycomb structures are formed of, for example, hexagonal shape, the fiber material used to form the walls is macerated at the top portion of the die where they will meet the substrate layer. The uncured substrate is then laid against the dies wherein the macerated end of the cell material lies against the substrate. The entire structure is then subjected to conditions of pressure and temperature to effect a cure. Normally the surface of the substrate is additionally slightly macerated as well as to provide exposed fibers. As a result, the final cured product has the fibers of the cell walls integrated with the fibers comprising the substrate. After curing, the die material is then removed, leaving a honeycomb structure.

To further improve the integration of the honeycomb with the substrate in a more conventional shape structure such as the the hexagonal honeycomb, the dies may be chamfered or curved at their top surfaces adjacent the substrate. This results in a fillet of the resin and reinforcement material at the joint where each cell meets the substrate, further increasing the strength of the resultant structure. When the dies are removable they can be of metal that will not melt during the conditions of curing. An example would be a lead-tin alloy. This material can then be removed after curing at a temperature 400°–500° F. during the postcure, where it is melted and flows out of the structure. However, an additional advantage of this invention lies in the utilization of molds of ablative material. In such instance the molds may be thermosetting material, such as phenolics or polyphenylenes. It is particularly desirable to often prechar the ablative die forming material so that the honeycomb structure can be formed about dies having final dimensional size and minimize shrinkage during subsequent precharring of the completed structure. As can be seen, this provides for a means wherein the cell filling material, which in this case is the die used to form the honeycomb structure of the invention as well, can be thoroughly inspected for integrity prior to its utilization as dies and incorporation in the honeycomb structure.

Another advantage, as can now be seen from the herein invention, is the fact that through the use of the dies described, the cell wall thickness can be varied and the size of the individual cells at a given point on a structure can be predetermined. More importantly, the dies can be made so that when they are bent to conform to a curved shape of the substrate prior to the incorporation of the fabric for the walls, the cell walls can be perpendicular to the substrate at all points. In other words, the die strips are prebent prior to the wrapping of the fabric therebetween. Such cell walls will have been previously formed in accordance with a design wherein the walls are made perpendicular to the predetermined curved surface in which they will be used.

It is believed the invention will be further understood from the following detailed description and drawings in which:

FIG. 7 discloses a formed conical element utilizing the method of this invention;

Figure 1:
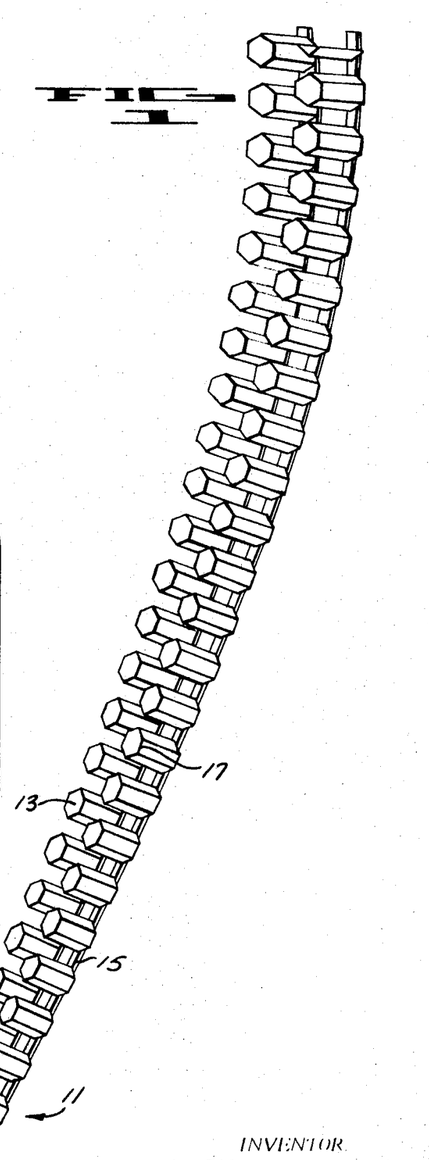
FIG. 1 is a pictorial representation of two strips of hexagonal dies of the invention.

Turning now to FIG. 1, there is shown pictorially two strips of molds for forming the cellular structures of this invention. As can be seen, the strips 11 are comprised of hexagonal pieces 13 integrally molded to a flat bottom strip 15. Obviously the height of the cells 13 determines the depth of the cellular structure. Generally, the length of each strip will be equivalent to the length of the final product, though it can be readily appreciated that a plurality of strips laid end to end can achieve the same result for a piece having great length. As shown, the top of the cells 13 are chamfered or curved at 17 which will serve to provide a filleted area in the final product, as will be further explained. The material for the cells 13 must be able to maintain its integrity at the temperatures and conditions of cure of the fiber reinforced structure. Typical cure temperatures and pressures in this art are on the order of 300–320°F. and 2,000 p.s.i. When the dies are desired to be removed they should be susceptible of melting at normal postcure conditions which are usually in the range of 400°–500° F. Regardless however of the particular temperatures and pressures, the main criteria for the material used in removable dies is, as indicated, that they maintain their integrity during curing conditions and are susceptible to being melted at postcure conditions or other temperatures which will not affect the basic structure. Examples of metal die materials include tin-zinc alloys, lead-tin alloys and the like. A specific alloy composition is a 50:50 lead-tin one.

Additionally, the bottom strip 15 is usually of the same material as the cells 13 since the dies are normally cast, machined, or formed as extrusions. Since the alloys utilized are generally of a relatively soft metal, the strips 15 are thus quite pliable enabling the strips to be bent in conformation with a given curve structure which is desired to be reproduced. Furthermore, the dies can be of a material which is suitable to being permanently left in the formed cells. In such an instance, the strips 15 are subsequently machined off or removed from the structure. When the cells 13 are to be left within the formed structure, they could be of an ablative material which preferably has been precharred so that it has obtained its final dimension prior to utilization as a die for forming the honeycomb. Also, the precharring is valuable to improve the erosion resistance of the composite structure during end use application in a high temperature environment. Thus, the dies can be of any material which will sustain the conditions of the cure for the structure. Various resin polymers are suitable, such as phenolic, polyimide, melamine, polyamide, polyphenylamines, fluoroethylene, and many other suitable high temperature polymers. In addition to polymeric materials, the dies can be formed of polymeric materials having fiber reinforcement. Short macerated fibers or whiskers or other forms of reinforcement could be incorporated in the polymer material utilized to form the individual cells 13. Examples of such fibers include graphite, boron, ceramics such as zirconium oxide and the like, all of which are well known and utilized in high temperature technology and ablatives.

Figure 2:
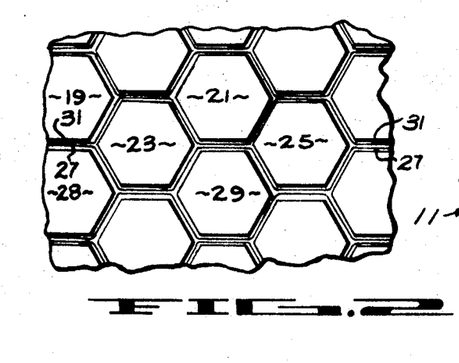
FIG. 2 is a schematic representation of the dies used with relation to the wrapped fabric.

FIG. 2 schematically 31 the relation of the cells 13 to the fabric wrapped therebetween. Firstly, two strips are placed side by side as seen in FIG. 1. In FIG 2, cells 19 and 21 are on one strip while cells 23 and 25 are on the adjacent strip. Woven fabric or fibers 31 that have been preimpregnated are then placed between the two strips. The fibers, for example, could comprise a continuous woven fabric with a width slightly greater than the height of the individual cells or that would extend slightly above the top of the cells. By fitting the two strips together cells 19 and 21 mesh with cells 23 and 25 causing the fabric to conform to the hexagonal configuration of the cell. A third strip having cells 28 and 29 is then added, with another fabric 27 placed between these cells and those previously utilized. As can be seen, this forms a double wall between cells 19 and 28 and 21 and 29 respectively, while forming a complete hexagonal cell about form 23 and 25. In this manner with the continuing addition of strips about a chosen configuration, a buildup of a cellular structure is obtained.

Figure 3:
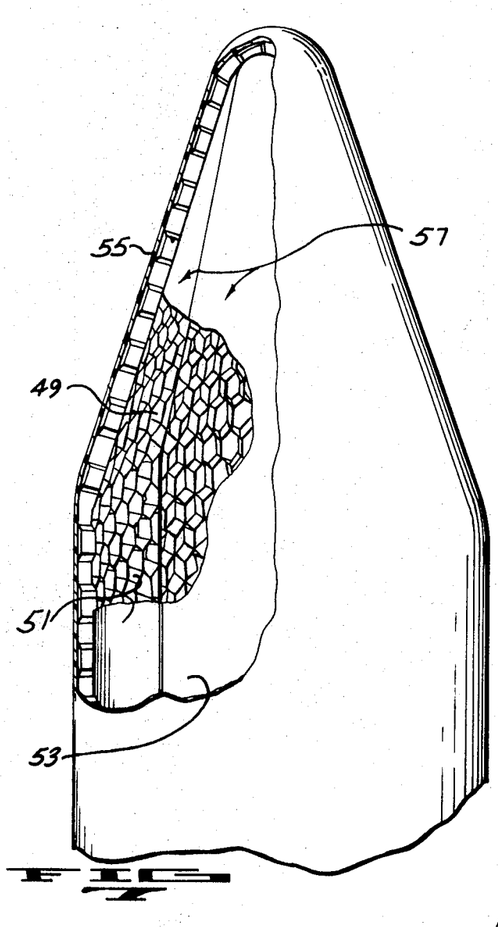
FIG. 3 is a partially sectioned pictorial view of a plurality of dies of the invention with the fabric wrapped therebetween.

Referring to FIG. 3, one can see the effect of building up a particular structure using strips 11 as molds to form the desired item. The strips 11 are laid down about a layup table surface or mandrel 33 and can be secured to the table by suitable fixtures (not shown) such as clamps to hold the (not of each strip in place at the time it is initially laid down. The layup form is shaped to the desired configuration of the end product, thus the strips are caused to curve or bend as required. A layer of fabric 35 is shown prior to being placed between adjacent strips. Although the process as shown in FIG. 3 can be repeated about an entire diameter, however, normally it is desirable for each construction to merely form a section, such as a quarter or an eighth section of the final end product, and add these sections together in a forming mold to cure.

Figure 4:
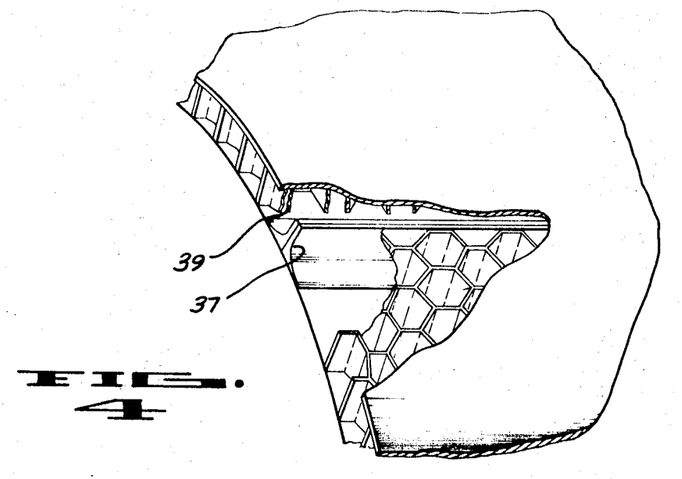
FIG. 4 is a partially sectioned pictorial view particularly showing fitting joints so that adjacently formed segments of the member can be rigidly attached.

FIG. 4 shows an unusual advantage of the instant process wherein fittings or flanges 37 can be incorporated integrally within the structure and bonded to cells 39. Such fittings are often desirable where the part formed must be removed periodically or separated into parts. Such fittings 37 are placed on the layup form adjacent a strip of the molds, so that when the mold is melted out, the remaining structure shown in FIG. 3 has the cells 39 immediately abutting the fixtures 37 with the resin used bonding the adjacent cells directly to the fixture. Alternatively, the fixture can be of the same material, for example, as the wall structure of the honeycomb and thus would be fabricated in place as part of the overall structure.

Figure 5:
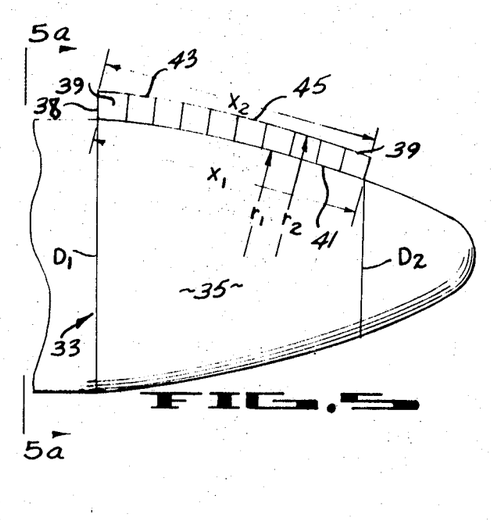
FIG. 5 is a schematic representation of a conical shape with design criteria for the mold cells.
Figure 5A:
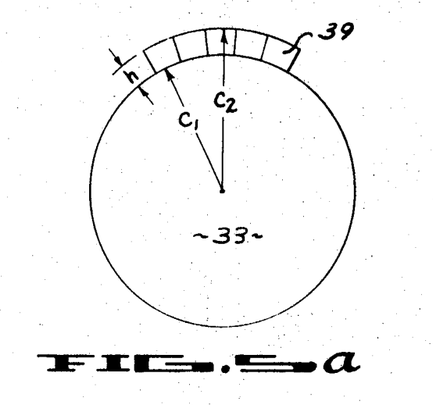
FIG. 5a is a section along lines 5a–5a of FIG. 5.
Figure 6:
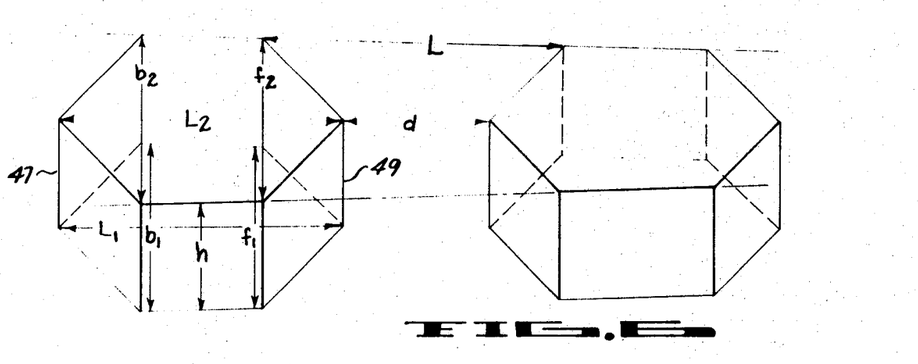
FIG. 6 is a diagram of two adjacent cells of a hexagonal mold of the invention to disclose relative dimensions used in calculating the die configuration.

Turning now to FIGS. 5 and 6, a brief explanation will be given on the general design configurations taken into consideration in forming the individual cells that comprise the die strips used. A conical form 33 is shown in FIG. 5 to indicate the design configuration problems. A segment 35 of the form is used for illustrative purposes. As can be seen, the segment 35 has a large diameter $D_1$ at the base, and a smaller diameter $D_2$ towards the front of the cone. The distance along the surface of the segment between diameters $D_1$ and $D_2$ is represented as $X_1$. Assuming that the molds of the invention are laid upon this section 35, then it is particularly desirable that the sidewalls of each cell be perpendicular to the substrate surface which will replace the cone in the end item. Thus, the walls 38 of the individual cells 39 are each normal to the surface 41 of the section 35. It can be seen that the walls thus are forced to diverge away from the surface 41. This is explained by the fact that the surface 41 is on a radius $r_1$ while the tops of the cells 43 form a surface 45 which is on a radius of $r_2$ Since $r_2$ has a greater radius it can be seen that the distance $X_2$ is greater than the distance $X_1$. Thus, for an individual strip running along the segment 35, the length of each cell at its top along line $X_2$ is greater than the length of each cell along its bottom or along $X_1$. This distance is shown as $L_2$ on the diagram of FIG. 6 at the top of the individual cell 39 shown in FIG. 5. Thus the walls 47 and 49 at either end of the distance $L_2$ will tend to taper upwardly. In the same sense as shown in FIG. 5a, wherein the cross section through cone 33 is taken, it can be seen that the cone has a radius of $C_1$ which forms the base of the individual mold 39. The tops of the molds, however, lie on a radius of $C_2$, which is greater than $C_1$ by the height $h$ of the cells. Assuming that it is desired to have forty cells disposed about an entire circumference, it can be seen that the base of each cell would be 1/40 of the circumference at the smaller radius $C_1$, while the top portion would be 1/40 of the circumference at the radius $C_2$. Thus the top would be wider than the bottom in this dimension also. Specifically as seen in in FIG. 6, the distance $b_2$ on the top of the cell would be wider than the like distance $b_1$ on the bottom of the cell. Since the circumference is continually decreasing as the strip moves toward the front of the cone, the distance $f_2$ toward the front of a given cell would be less than the distance $b_2$ at its back or rear, due to the change of circumference of the cross section. Likewise, $f_1$, the corresponding distance at the bottom of the cell would also be less than $f_2$ at the top. As can now be seen, this geometry is straightforward. The description is given to explain how one can, by (a) setting the number of cells desired about a given shape, (b) setting a constant overall length, L, of each cell, and (c) giving a constant height, $h$, to each cell, determine the remaining parameters from the curvature of the surface.

The mold to form the parts is constructed in accord with the desired end product, so that straight flat strips can be produced which when curved to the final desired curvature produce cells that are at all times perpendicular to the surface of the substructure. As shown in FIG. 6, L, which is the length of a given cell, is maintained as a constant parameter. Thus, the distance, $d$, between individual cells will vary according to the amount of curvature of a surface. It is pointed out that one could set another dimension as fixed and vary others accordingly about a curvature. However, it has been found for simplicity of design that the length of a cell be maintained as the constant parameter in the design. The specific example given was for a honeycomb structure surrounding a substrate. Obviously, the same calculations can be made where the substrate will cover the honeycomb. Since the cells tend to taper when utilizing curved surfaces, they may obviously be either of male or female construction that is, the strip to which the cells are attached can be at the widest or narrowest end of the cells, depending upon the location of the substructure. The substructure obviously will always be placed on the side of the cell opposite from that of the strip. Where the strip is on the widest end of the cells, the cells can then be merely pulled out of the formed structure, whereas when the strip is on the narrow side, the cells have to be melted out of the formed structure.

FIG. 7 depicts a conical shaped member wherein the honeycomb structure 49 is formed in various segments 51 and 53, which have been integrally molded to a top substrate 55 and adhesively bonded to an inner layer 57, as will be further explained. As shown in this structure the dies have been removed from the formed honeycomb leaving the individual cells. The FIGURE additionally serves to depict the utilization of the honeycomb in a curved structure where all the walls of the honeycomb elements can be maintained perpendicular to the substrate 55.

The fabric or fibers which are wrapped between the molds of the invention can be of virtually any reinforcement fibers. For high temperature applications particularly, fibers that are well known and utilized include silica, glass, quartz, carbon, graphite, boron and the like. Any suitable high-temperature resin material may be used that is utilized as the binder for the fibers which are normally preimpregnated prior to their being wrapped about the molds of the invention. The matrix resins include phenolics, polyimides, polyphenylamines, epoxys, silicones and the like, depending upon the given application. When the cellular structure is directly exposed to the environment, it would often be preferable that the resin used be of a char-forming material whereas when it serves to reinforce a substrate that is exposed, such char forming resins would not be necessary. The resinous material as well as the particular fibers are well within the skill of the art and do not form part of the invention.

Figure 8:
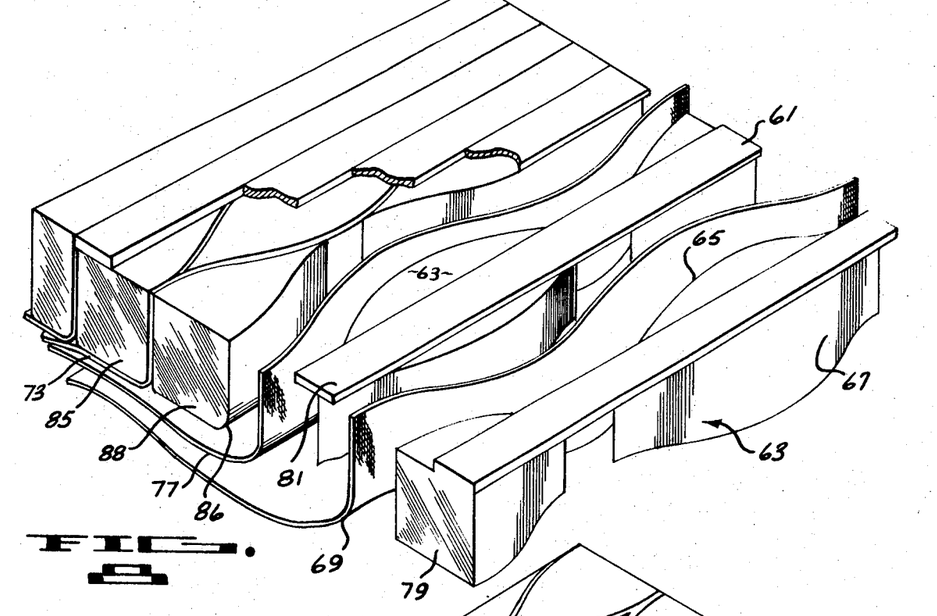
FIG. 8 is a pictorial representation of the dies with the fabric wrapped therebetween to form cells having curved walls and utilizing the fabric additionally as the substrate material.
Figure 9:
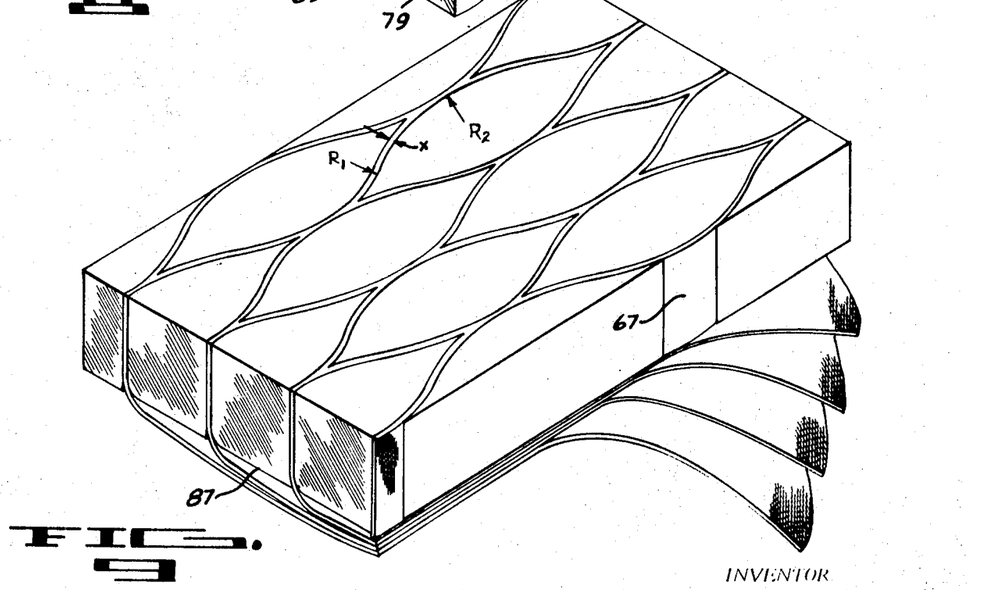
FIG. 9 is a pictorial representation of the dies of FIG. 8 fitted tightly together prior to cure conditions.

Referring now to FIGS. 8 and 9, there is shown a further embodiment of the invention. In this form of the invention, the fabric laid between the dies is the same material used to form the substrate, thus completely assuring an integral bond between the honeycomb and the substrate. However, in order to achieve this effect it has been found that the dies preferably form cells having curved walls. Thus as shown in the FIGS., the strips 61 have attached thereto a plurality of cells 63 having curved walls 65 and 67. The pattern formed by the fabric as shown in FIG. 8 is a configuration similar to a sine wave. As can be seen, individual layers 69, 77, 73 of fabric are laid between adjoining dies 79, 81, 88 and 85 respectively. The portion of the fabric that extends beyond the cells is laid over the back portion 87. The substrate will have a thickness depending upon how many individual strips are covered by a given fabric layer. If each fabric layer extends over one cell, then the thickness of the substrate will be equivalent to one sheet of fabric. The configuration of these particular cells is determined as shown in FIG. 9 wherein the sides of the cells have a curvature along a radius $R_2$. X represents the thickness of fabric between the walls. Thus, the sides adjacent either end of the cell have a radius of $R_1$. $R_1$ must equal $R_2+X$ to achieve proper spacing between die walls for the fabric. The curvature of the die walls and the rounded edges 86 at the bottom serve to prevent undue folding of the fabric and to hold it straight so that it can be effectively bent around behind the dies to form the layer of the substrate. The dies together with the material therebetween as shown in FIG. 9 can then be placed in a suitable mold and subjected to temperature and pressure whereby a structure having complete integration between the cells and substrate is formed. The dies may then as indicated either be left in place when they are of suitable material, or removed when they are meltable material such as metal or suitable nonmetallics.

Figure 10:
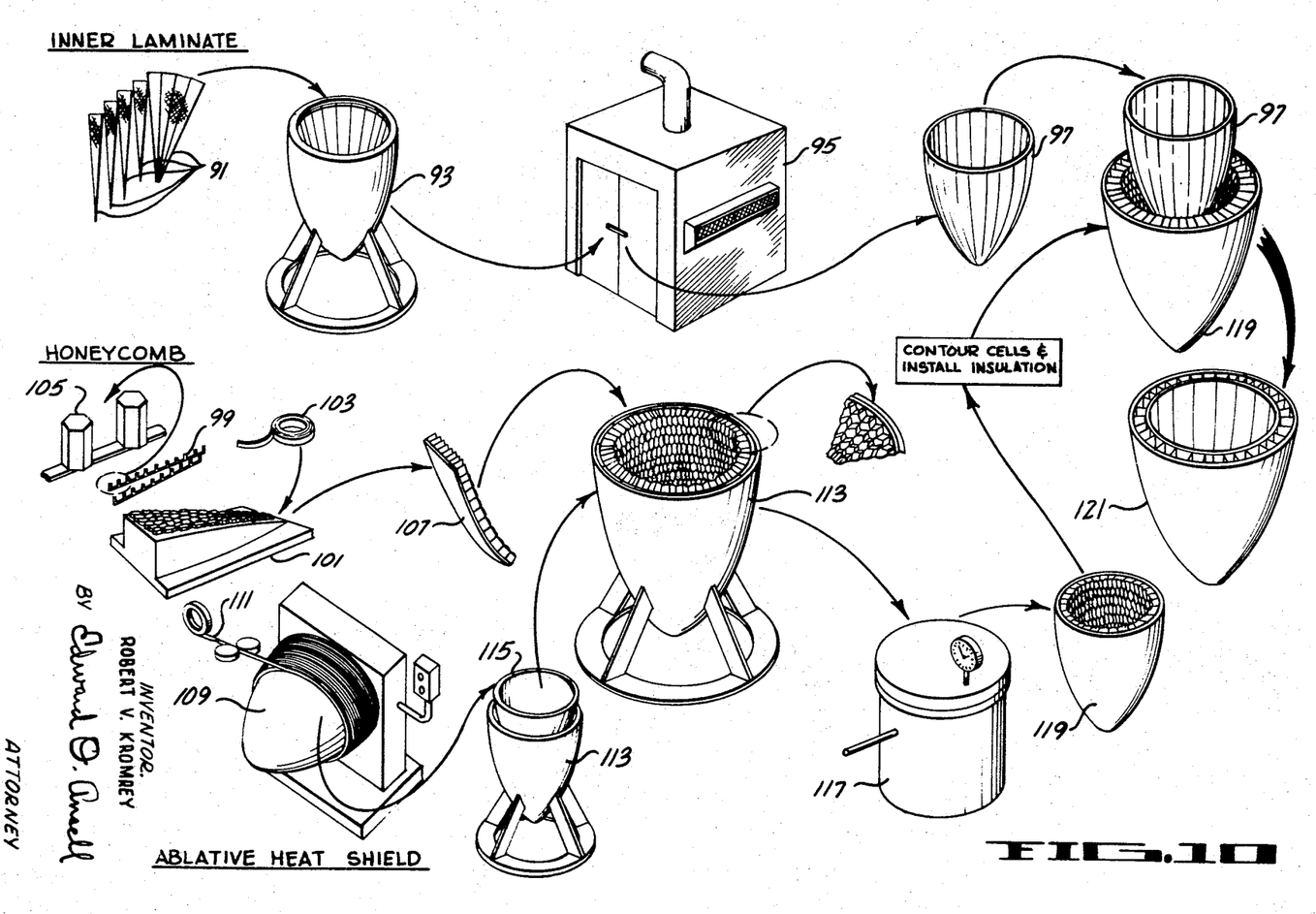
FIG. 10 is a schematic representation of the several steps used in forming a conical member utilizing the method of this invention.

A specific example of forming a part is depicted in the schematic process representation of FIG. 10. The figure depicts the steps used to form a honeycomb heat shield which is a conically shaped element as seen. There are three major elements that comprise the finished product, namely an inner laminate, the honeycomb structure and the outer ablative heat shield. The inner laminate is formed of a plurality of sections 91. The sections are of style 181 glass fabric which has been preimpregnated with a phenolic resin. The individual elements 91 are then placed in a female mold 93 to form a conical element and provided with a vacuum bag. The mold is then placed in an oven 95 where it is cured at 300° F. for 2 hours under 27 inches mercury vacuum. The cured part 97 is then removed from the mold and is ready for use as an inner laminate shell for the final structure. The honeycomb is formed by placing mold strips 99 on a layup table 101 which has a configuration of a segment of the desired cone. Precut tape 103 is used to wrap between the mold strips 99 to form the segment. Upon completion of wrapping the tape between the individual mold dies 105, a segment 107 can be lifted from the layup table. The dies utilized are an alloy 50:50 lead-tin, while the tape was of Style 181 glass fabric preimpregnated with phenolic resin. The outer ablative heat shield is formed on a mandrel 109 by wrapping continuous tape 111 thereabout. The composition of the outer ablative heat shield can be carbon fabric and phenolic resin. The tape wrapped heat shield is placed in a female mold 113 after it is removed from the mandrel 109. The mold 113 with the preformed ablative heat shield 115 therein is then ready for further utilization wherein the individual prepared honeycomb segments 107 are placed within the mold adjacent the preformed heat shield 115. Mold 113 with the ablative shield and the individual segments 107 of the honeycomb structure is then placed in an autoclave or hydroclave 117 where the heat shield and honeycomb are integrally bonded at temperature 300° F. which is maintained by water passing into the hydroclave at pressures between 200 and 1,000 p.s.i. applied against a pressure bag which covers the part. The completed structure of the ablative shield with the honeycomb 119 is then removed from the autoclave upon completion of the cure which takes place at approximately 8 hours. The honeycomb dies are then removed from the structure by merely melting the dies out from the honeycomb during the standard postcure at 450° F. for 8 hours. The structure 119 is conformed by machining and is then ready for utilization together with the inner laminate shell 97 which is inserted within the honeycomb. Prior to insertion, the inner laminate 97 is coated with an adhesive which is Epon 422 resin. The completed structure is then subjected to a temperature of 350° F. wherein the adhesive bonds the inner laminate to the honeycomb heat shield to give a final three-layered structure 121 which is then ready for utilization as a heat shield.

Figure 11:
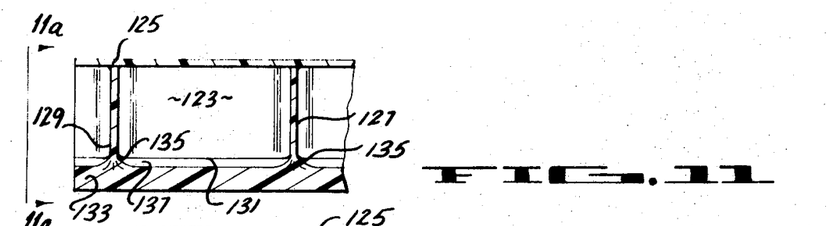
FIG. 11 is a partially sectioned pictorial representation of the relationship of elements used to form the products of the invention.
Figure 11A:
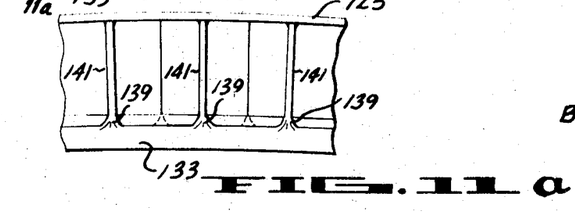
FIG. 11a depicts a final cell resulting from joining the elements of FIG. 11.

The end effect of the process as described is well illustrated in FIGS. 11 and 11. There is seen in FIG. 11a, a section of an individual die 123 affixed to a strip 125. Surrounding the die is a fabric 127 which has been preimpregnated with a suitable resin as indicated. The surface of the die 123 is chamfered at 129 at the surface opposite that affixed to the strip 125. This surface 131 is that which will eventually mate with a substrate 133. The fabric 127 is frayed at 135 adjacent to the chamfered portion 129. Additionally the fabric extends slightly beyond the surface 131 of the die. The surface of the substrate has been frayed 137 adjacent to the surface 131 of the die. Thus, when the die is brought into contact with the substrate in conditions in a hydroclave under pressure and temperature, the frayed fibers 135 of fabric 127 will mesh with the surface fibers 137 of the substrate 133. The resin and fibers in both the substrate and the fabric 127 will fill in the chamfered area with a resultant product as shown in FIG. 11a wherein a filleted area 139 affixes the walls 141 of a honeycomb to the substrate 133 in the final cured product. Not only is this fillet provided, but as can be seen the actual fibers of the fabric that comprises the individual cells will mesh and are intertwined with the fabric fibers of the substrate utilized providing a continuous and integral bond. This effect is virtually impossible to achieve without the instant invention. For example, if the dies were not left in place during the curing procedure the resin material would merely flow away from the joint between the walls and the substrate and not form a fillet 139 as shown. In other words, the fillet is caused to be formed by the chamfered portion of the die.

Though the invention has been particularly described with relation to the use of conventional fibers such as glass in resins such as phenolics and the like, which are often found in high temperature ablative application, it should be obvious that the herein invention relates broadly to a method for forming honeycomb structures of virtually any composition upon a substrate. The fibers can even be in the form of paper sheeting. When paper is used, the embodiment shown in FIGS. 8 and 9 having the walls forming the substrate is particularly advantageous. Thus, even fine metal wires imbedded in various resins can be utilized. Not only can the matrix in which the fibers are disposed be of a resinous or polymer composition, but it could even be comprised of ceramic materials, such as cermets. It is apparent that the greatest strength between the walls of the honeycomb and the substrate material results from an interlock of the fibers in both the substrate and the cellular walls. However, great strength can be derived utilizing the method of this invention with a substrate having no fibers therein, utilizing the strength of fibers extending from the cellular walls into the substrate material. As a result, wall fibers can extend into a nonreinforced substrate which might be only comprised of a resin or other matrix material.

Additionally, low temperature applications are possible for materials formed by the method of this invention. It is contemplated that load-bearing walls, the previously mentioned boat hulls, and the like could be constructed in accord with the process of this invention utilizing resins and fibers that are not necessarily required for the previously described higher temperature applications.

The term "macerated" as used in the discussion of this invention with relation to the exposed fibers or fabrics extending from the die cells adjacent the substrate surface means that individual strands of fiber are exposed or extend from the die cells for interlocking or meshing with the substrate material. Such maceration can occur by mere cutting of certain weave fabrics or can be a special process of cutting a fabric whereby the fibers are spread apart to achieve the desired end result. The surface of a fibrous substrate, when used, can be macerated for example by using a tool bit on a lathe to unravel the fabrics or fibers imbedded in the substrate at its surface and cause them to be exposed for meshing with the fibers of the cell walls.

It would be apparent to one skilled in the art that many variations of the herein teaching are possible. For example, one could additionally chamfer the bottom surface of the die members which are attached to the strips, so as to form a broad ridge on the edge of the honeycomb that is not attached to the substrate material. The broad edge of the cells would thus enable a greater area of attachment to an inner laminate such as shown in the process of FIG. 10 when such is utilized.

While the method and device of this invention have been described and illustrated in detail, it will be understood that the foregoing specification and drawings are by way of illustration and example only and are not to be taken by way of limitation, the spirit and scope of this invention being limited only by the terms of the following claims:

I claim:

1. A method of making shaped honeycomb structures comprising:
   providing a plurality of dies having a configuration of the desired cells of said honeycomb structure,
   aligning said dies to conform to a predetermined shape of the honeycomb structures,
   wrapping fibers between said dies whereby said fibers assume the configuration of walls of said cells and conform to the shape of the honeycomb structure,
   impregnating said fibers with a binder, and solidifying said binder.

2. The method of claim 1 wherein said binder is a curable resin and said formed fibers are cured about said dies.

3. The method of claim 2 wherein said fibers are preimpregnated with the binder prior to being wrapped.

4. The method of claim 2 wherein said dies are melted from said formed structure after solidification.

5. The method of claim 1 additionally comprising:
   forming said dies of a material suitable for remaining in said formed honeycomb structure after solidification.

6. The method of claim 5 comprising:
   forming said dies of a high temperature resin,
   precharring said formed resin dies prior to their use for wrapping the honeycomb structure.

7. A method of making shaped honeycomb structures affixed to a suitable substrate comprising:
   providing a plurality of dies affixed at their base to a continuous strip to form discrete strips of dies, said dies having a configuration of the desired cells of said honeycomb structure,
   aligning said dies to conform to a predetermined shape of the honeycomb structure,
   wrapping fibers between said dies whereby said fibers assume the configuration of walls of said cells and conform to the shape of the honeycomb structure,
   impregnating said fibers with a binder,
   placing said substrate adjacent the top surface of the die-formed honeycomb structure and solidifying said structure.

8. The method of claim 7 comprising:
   providing said fibers in the form of a woven fabric.

9. The method of claim 8 wherein said cells have curved walls and said fabric forming said walls extends from between said dies for forming said substrate and comprises:
   laying said fabric extending from between said dies over the top of said dies and formed precured structure parallel to the base of said dies wherein said laid-over fabric comprises an integrally formed substrate with the portion of said fabric formed into the walls of the cells of said honeycomb structure.

10. The method of claim 9 wherein said binder is a curable resin impregnated into said fabric.

11. The method of claim 8 wherein said substrate is a resin-impregnated separate element.

12. The method of claim 7 wherein said substrate has a curved surface adjacent said dies and further comprising:
    bending said die strips in conformance with said curved substrate, 13. The method of claim 12 comprising:

wherein said configuration of said dies includes a predetermined taper from said base whereby said cells walls are perpendicular to the curved substrate.

14. The method of claim 7 comprising forming said cell walls to have fibers extend slightly above the top of said dies.

15. The method of claim 14 additionally comprising macerating the exposed fibers prior to said substrate being placed thereon.

16. The method of claim 7 additionally comprising using a fiber-reinforced substrate and macerating the surface of said substrate adjacent the exposed fibers of said cell walls prior to placing said substrate over said cells.

17. The method of claim 7 further comprising:
providing a chamfer at the top surface of the dies, whereby a fillet is formed where said cell walls join said substrate.